May 28, 1946.  S. A. NASH-BOULDEN  2,400,945
STRETCHER PACK SADDLE
Filed June 1, 1945  2 Sheets-Sheet 2

Inventor
S. A. NASH-BOULDEN

UNITED STATES PATENT OFFICE 2,400,945

STRETCHER PACK SADDLE

Stephen A. Nash-Boulden, Santa Barbara, Calif., dedicated to the free use of the People in the territory of the United States Application June 1, 1945, Serial No. 597,051

1 Claim. (Cl. 54—37)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the Territory of the United States to take effect on the granting of a patent to me.

This invention relates to a pack saddle especially designed for mounting a stretcher to be carried on a pack animal such as a mule. The object of the invention in general is to provide a saddle which is securely held on the animal's back against slippage in any direction relative to the animal, but which mounts a stretcher so that it is relatively free of jolts due to the motion of the animal while walking. With this type of saddle and stretcher mount, an injured person can be carried safely over a mountainous terrain, since in climbing steep inclines or making steep descents, the stretcher is prevented from slipping and does not unduly jolt the patient.

The accompanying drawings illustrate the invention, in which

Figure 2:
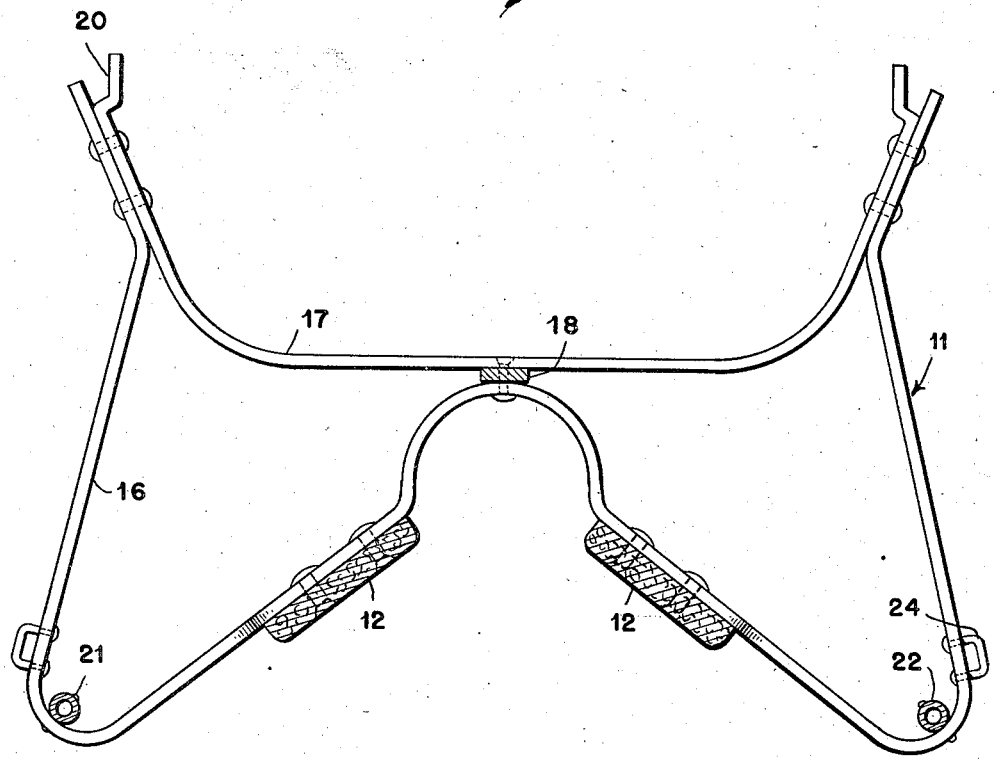
Figure 2 is a section taken on the line 2—2 of Figure 3.
Figure 3:
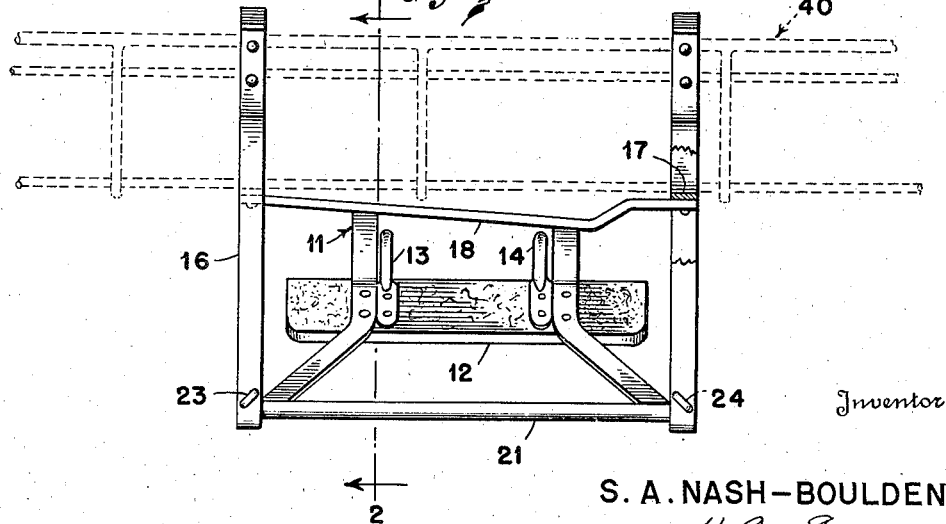
Figure 3 is an elevation showing a detail of the saddle.

The saddle is provided with a stretcher frame 11. A back pad 12 formed of a pair of flexible members to engage the back of the animal is secured to the frame, a saddle blanket being used in the conventional manner. The pair of members of the back pad are secured together with mounting brackets 13 and 14. The stretcher frame is formed by a forward pair of bent metal straps 16 and 17 secured together in the manner illustrated in Figure 2, and by a similar pair of bent metal straps for the rearward portion of the frame. A tie member 18 secures the forward and rearward portions of the stretcher frame. The frame provides four upwardly extending arms each having an upwardly opening U-shaped member as shown at 20 at its upper free end. Tie rods 21 and 22 are also provided to hold the forward and rearward portions of the frame together, and strap slide clips such as shown at 23 and 24 are securely attached to the frame member.

Figure 1:
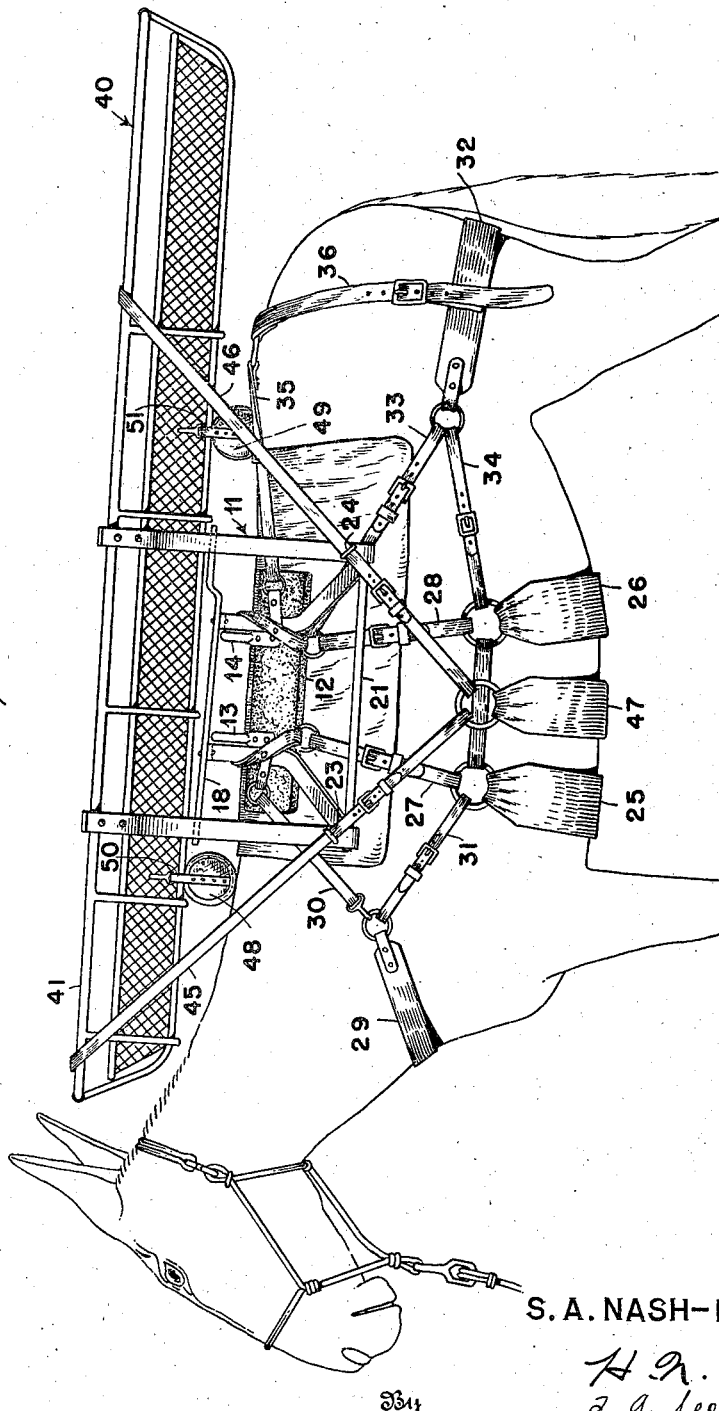
Figure 1 is a side elevation of the saddle and stretcher complete mounted on a mule.

The back pad is mounted on the animal and held tightly down by a cinch of flexible straps 25 and 26 detachably secured to the stretcher frame with straps 27 and 28. A breast pad 29 for engaging the animal's breast is detachably secured to the stretcher frame and to the cinch by straps 30 and 31, respectively. This prevents rearward slippage of the saddle in case the animal is climbing a steep ascent. A breech 32 is also attached to the stretcher frame for preventing forward movement of the saddle as the animal descends a steep incline. The breech is attached to the stretcher frame and to the cinch with detachable straps 33 and 34, respectively, and is held in proper position and made adjustable relative to the animal by means of straps 35 and 36. Only the left side elevation is illustrated in Figure 1, but it is to be understood that the right side elevation is substantially similar to that illustrated in the figure.

To unsaddle the animal, the breast pad 29 is detached from the straps 30 and 31, the breech 32 is detached through strap 34 and the cinch is detached through straps 27 and 28.

The stretcher 40 is of conventional design, and has a pair of side members one of which is shown at 41. Means for removably mounting the stretcher on the stretcher frame and holding it against slippage is provided by the U-shaped members 20, heretofore mentioned, and by tie members in the form of straps 45 and 46, the strap 45 being attached at one end to the forward portion of the stretcher, while the strap 46 is attached at one end to the rearward portion of the stretcher. The straps 45 and 46 are slidingly threaded through clips 23 and 24, respectively, and are detachably secured to a stretcher girth 47 as illustrated in Figure 1. Due to this manner of mounting, as the animal walks the rocking motion imparted to the shoulders and rump tends not to be imparted to the stretcher, or is minimized, since the straps 45 and 46 slip slightly in clips 23 and 24, the girth 47 being in a central position of the animal's body or a nearly neutral position relative to the motion of the animal.

Cushioning of the stretcher on the animal's back is obtained by use of padded or resilient rolls 48 and 49 mounted under the stretcher and on the animal's shoulders and rump, respectively. These rolls are simply formed of elongated canvas bags stuffed with resilient material, such as cotton, and may be detachably mounted on the stretcher with straps and spring snap fasteners, as shown at 50 and 51.

Having thus described the invention, what is claimed is:

A stretcher pack saddle comprising a stretcher frame provided with upwardly extending arms having free upper ends and having a back pad secured thereto for fitting the back of a pack animal, a cinch attached to the stretcher frame for securing the back pad tightly onto the animal's back, a breast pad attached to the stretcher frame for engaging the animal's breast to prevent rearward slippage of the saddle on the animal, a breech attached to the stretcher frame for engaging the animal's buttock to prevent forward slippage of the saddle on the animal, and means for mounting a stretcher on the stretcher frame, said means comprising upwardly opening U-shaped members attached to the free ends of the arms for receiving the side members of a stretcher, a girth centrally positioned relative to the animal's body, and tie members for attaching to the forward and rearward portions of the stretcher and to the girth.

STEPHEN A. NASH-BOULDEN.